Patented Sept. 6, 1949

2,481,388

UNITED STATES PATENT OFFICE 2,481,388

HYDROLYSIS OF POLYVINYL ESTERS

Harold W. Bryant, Niagara Falls, N. Y., assignor to E. I. du Pont de Nemours & Company, Wilmington, Del., a corporation of Delaware No Drawing. Application August 24, 1945, Serial No. 612,559

4 Claims. (Cl. 260—91.3)

This invention relates to the hydrolysis of polyvinyl esters and more particularly, hydrolysis by reaction with hydrolytic alcohols to produce polyvinyl alcohol and similar products.

Polyvinyl esters, for example polyvinyl acetate, can be hydrolyzed by reaction with methanol or other hydrolytic alcohol to form useful products including various grades of polyvinyl alcohol. In general, two methods are commonly employed. In one method, the polyvinyl acetate may be dissolved in the alcohol, with or without the addition of other solvent, to form a mobile solution and a catalytic agent, usually alkali metal alcoholate, is added as hydrolysis catalyst. The reaction mixture is then usually heated to reflux temperature with stirring until the desired degree of hydrolysis has been obtained. The catalyst may then be destroyed by the addition of an acid, such as acetic acid and the solvent, including excess alcohol, and methyl acetate formed in the reaction is distilled off. In another method as described in Berg, U. S. Patent 2,227,997, a relatively large amount of polyvinyl acetate is mixed with the alcohol, with or without the addition of another solvent in such portions as to form a viscous kneadable plastic mass or a highly viscous homogenous solution. A catalyst, such as sodium methylate, may then be added and the mass is subjected to kneading in a conventional kneading machine or the like, with or without further addition of catalysts as may be necessary, until the desired degree of hydrolysis has occurred.

Carrying out the above described reaction, it is desirable to carefully control the rate of hydrolysis in order to produce a uniform product. Such control has been difficult, because the alkaline materials heretofor used as catalysts are very active and hence can be added with only small quantities, either continuously or intermittently during the course of the reaction. Especially in the kneading process, such addition of catalyst during the course of the reaction has not been altogether satisfactory, because it is impossible to thoroughly disperse the catalyst throughout the reaction mass before it exerts a certain catalytic action, and therefore hydrolysis occurs at different rates at different points in the mass. If all the catalyst is added to the solvent before introduction of the polyvinyl ester, the immediate formation of relatively insoluble hydrolysis products interferes with properly dissolving the polyvinyl ester in the solvent, and the exothermic reaction occurs at a too rapid rate for satisfactory operation.

An object of the present invention is to provide a new and improved catalyst for the hydrolysis of polyvinyl esters by reaction with hydrolytic alcohols. A further object is to provide an improved means for controlling the hydrolysis reaction. Still other objects will be apparent from the following description of the invention.

I have discovered that guanidine carbonate is an excellent catalyst for reacting a polyvinyl ester with methanol or other hydrolytic alcohol to produce hydrolysis products, such as polyvinyl alcohol. I have found that guanidine carbonate is less active as a catalyst and therefore, by its use, the reaction is more easily controlled than in the case of alkaline catalyst used heretofore.

In one method of practicing my invention, a quantity of methanol is placed in a kneading machine and the required amount of guanidine carbonate is added. The amount of guanidine carbonate required will depend upon the rate and degree of hydrolysis desired and the amount and kind of polyvinyl ester to be hydrolyzed. For example, for the hydrolysis of polyvinyl acetate, the amount of guanidine carbonate may vary from 0.1 to 5% of the weight of the polyvinyl acetate to be hydrolyzed. Still larger amounts may be used, if desired. The mixture of guanidine carbonate and methanol is heated to 45° to 50° C. and stirred until the guanidine carbonate is completely dissolved. The solution is then cooled to room temperature and polyvinyl acetate, preferably in the form of small beads or other finely divided form, is rapidly added and stirred until a substantially homogenous, viscous solution or kneadable plastic mass is obtained. The weight ratio of the polyvinyl acetate to the methanol may be from 0.1:1 to 1:1 depending on the molecular weight of the acetate. The mixture is then rapidly heated to about the boiling point of the methanol or reflux temperature and maintained at this temperature while subjecting the mixture to a thorough kneading operation. Methanol vapor formed is condensed and returned to the mass by means of a suitable reflux condenser. Periodically, samples are taken and analyzed to determine the degree of hydrolysis, and when the analysis shows that the desired degree of hydrolysis has been reached, the catalyst is destroyed by the addition of acetic acid. The methanol and the methyl acetate formed by the reaction are then removed from the product by distillation.

In another method of practicing the invention, I dissolve the guanidine carbonate in the methanol as described above and then, after cooling, introduce carbon dioxide to saturate the solution therewith. I then add the polyvinyl ester and heat and knead as described above. The carbon dioxide inactivates the guanidine carbonate catalyst so that appreciable hydrolysis does not occur while the polyvinyl ester is being dissolved in the methanol. On kneading at this elevated temperature, the carbon dioxide is gradually driven off, and the hydrolysis reaction commences.

It is to be noted that in practicing my invention, I may add all of the guanidine carbonate catalyst required for the desired degree of hydrolysis prior to the introduction of the polyvinyl ester. I have found that this catalyst although less active than strong bases will promote rapid alcoholysis of polyvinyl esters at temperatures above 45° C. and that the catalyst is not destroyed as rapidly at these temperatures as strong bases. Also, the rate of alcoholysis is not affected as much with this catalyst as it is with strong bases in the presence of small amounts (e. g., 1%) of water. The reaction rate is very fast at first (in the absence of $CO_2$) but decreases rapidly as the concentration of methyl acetate in the system increases. The degree of hydrolysis can be more accurately controlled than with strong bases as catalyst by selecting the proper amount of guanidine carbonate, the proper temperature and stopping the reaction at a predetermined time. The hydrolysis rate is also sufficiently slow in the latter stages of the reaction so that there is ample time to take and analyze samples to determine the degree of hydrolysis, and the degree of hydrolysis does not undergo any important change during the time required for taking and analyzing the samples especially when the reaction mixture is cooled to around room temperature.

The invention is further illustrated by the following examples:

Example 1

One gram of guanidine carbonate and 200 ml. of methanol were placed in a flask. The flask was placed in a water bath and the solvent was gently refluxed. A 15% solution of polyvinyl acetate in methanol was slowly added to the stirring mixture. After 15 minutes, a white precipitate of PVA was present in the flask. The addition of the polymer solution was continued until 200 g. had been added in 3 hours. The mixture was refluxed for an additional 2 hours. Five ml. of 8.5% acetic acid in methanol was added to neutralize the excess guanidine carbonate. The PVA slurry was then cooled, filtered and washed with methanol. A sample of dried PVA had a saponification number of 17.

Example 2

In a 1 gal. Baker Perkins kneader were placed 800 g. of methanol and 9 g. of guanidine carbonate. The carbonate was dissolved in the methanol by heating and stirring. High viscosity polyvinyl acetate (500 g.) was then added to the methanol solution and agitation was resumed. After 30 minutes at 24–28° C. a homogeneous solution was obtained. The temperature of the mixture was gradually raised by passing warm water through the jacket of the kneader. After 2½ hours with the temperature at 56–57° C., partially hydrolyzed polymer separated from the solution. A sample removed after 3 hours and 34 minutes had a saponification number of 213. The mixture was cooled to room temperature and remained at this temperature overnight. A sample removed after a total of 26 hours had a saponification number of 101.

Example 3

In a 3 gal. Baker Perkins kneader was placed 4020 ml. of methanol and 13.5 g. of guanidine carbonate. The temperature was increased to 43° C. and a clear solution of the catalyst in methanol was obtained. The solution was cooled and 2000 g. of high viscosity polyvinyl acetate was added. After 18 minutes the power requirement for kneading dropped sharply and heat was applied through the jacket. The temperature was maintained at about 60° C. Samples were removed at intervals:

| Time | | Sap. No. |
|---|---|---|
| Hrs. | Min. | |
| 2 | 0 | 266 |
| 2 | 30 | 209 |
| 3 | 0 | 169 |
| 3 | 12 | 164 |

The excess catalyst was neutralized and the solvent was removed by distillation. A very fluffy colorless product was obtained.

Example 4

Guanidine carbonate (18 g.) and methanol (3200 g.) were placed in a 3 gal. Baker Perkins kneader. The mixture was heated to reflux and was then cooled to room temperature. A clear solution resulted. Solid carbon dioxide (18 g.) was added to the solution and then high viscosity polyvinyl acetate was added. Steam was then passed through the kneader jacket to raise the temperature rapidly to about 60–64° C. After about 2 hours the solution was still clear indicating slight alcoholysis. Soon thereafter partially hydrolyzed polymer separated from the solution. After an additional 2½ hours the excess base was neutralized with acetic acid and the solvent was removed by distillation. A fine fluffy powder with a saponification number of 128 was obtained.

Example 5

Methyl acetate (64 g.), methanol (736 g.) and guanidine carbonate (4.5 g.) were placed in a 1 gal. Baker Perkins kneader. High viscosity polyvinyl acetate was then added and agitation was applied for 20 minutes. The temperature of the solution was then increased to about 60° C. After an additional hour partially hydrolyzed product began to separate. Kneading was continued for another 1½ hours and acetic acid was added. The solvent was distilled off leaving a coarse colorless product with a saponification number of 174.

The present invention is useful for hydrolyzing the various polymerized vinyl esters, e. g. the polymers of the vinyl esters of the following acids: formic, acetic, propionic, butyric, chloracetic, oleic, stearic, lauric, benzoic, and other carboxylic acids. It may likewise be used to hydrolyze the various copolymers of such vinyl esters with other polymerizable materials, for example the products obtained by copolymerizing the vinyl esters of carboxylic acids with vinyl halides, vinylidene halides, acrylic acid and its esters, methacrylic acid and its esters, acrylonitrile, methacrylonitrile and their homologs. Thus, the invention is useful for hydrolyzing the products obtained by polymerizing vinyl esters, either separately or in admixture (copolymerizing) with other polymerizable compounds, that is, any polymeric products which contain the grouping

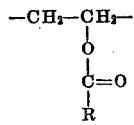

where R represents hydrogen or an organic radical.

It is understood that the invention is not restricted to the precise modes of operation described above as many modifications thereof will be apparent to those skilled in the hydrolysis of polyvinyl esters. For example, the process may be practiced continuously as well as in batch operations. The reaction conditions may be varied widely, as to temperature, pressure and proportion of solvents, reactants and the catalyst. The rate of hydrolysis may be controlled as desired by the amount of catalyst employed and the reaction temperature, as an increase in either causes an increase in the reaction rate.

While I prefer to add an amount of guanidine carbonate equal to about 0.1 to 5% of the weight of polyvinyl ester to be hydrolyzed, the invention is not restricted thereto. Smaller amounts, as low as 0.05% of the weight of the ester, will cause hydrolysis at a slower rate. If desired, larger amounts, e. g. up to about 20% of the weight of the ester may be used.

Also, the invention is not restricted to the above described kneading method, but may also be utilized for hydrolyzing the ester in solution in the hydrolytic alcohol or in other solvents.

The various low molecular weight alcohols known to hydrolyze polyvinyl esters can be used to practice the invention, methanol and ethanol usually being preferred. Higher alcohols, such as the propanols and butanols result in slower reaction rates.

In adding carbon dioxide to temporarily inactivate the catalyst, it is preferable, but not essential to add sufficient to saturate the solution or reaction mixture, although in many cases this may be in excess of that required for substantially complete inactivation. If desired, just the amount of carbon dioxide required for complete inactivation may be determined by a small scale trial and that amount added. Also, if desired, smaller amounts of carbon dioxide may be added to secure a partial inactivation of the catalyst. Generally, for complete inactivation, about 3 to 4 moles of carbon dioxide is required for each mole of guanidine carbonate initially present. If desired, the reaction mixture may be placed under a carbon dioxide atmosphere at superatmospheric pressure, but in most cases goods results are obtained by merely passing in carbon dioxide at atmospheric pressure.

The carbon dioxide may be introduced in any conventional manner, including addition of a carbonate and acid to evolve carbon dioxide in situ. I prefer to flow a stream of carbon dioxide into the reaction mixture or solution or to add solid carbon dioxide thereto.

I claim:

1. The process for hydrolyzing polyvinyl acetate which comprises dissolving guanidine carbonate in methanol, adding to the solution sufficient carbon dioxide to substantially completely inactivate the guanidine carbonate, then dissolving polyvinyl acetate in the solution and thereafter heating the solution to drive off carbon dioxide and finally stirring the solution at reflux temperature.

2. The process for hydrolyzing polyvinyl acetate which comprises dissolving guanidine carbonate in methanol, saturating the solution with carbon dioxide, then adding sufficient polyvinyl acetate to form a viscous kneadable mass and thereafter subjecting said mass to kneading at about the boiling temperature of methanol, while condensing vaporized methanol and returning the condensate to said mass.

3. The process for hydrolyzing a polyvinyl ester which comprises dissolving guanidine carbonate in a hydrolytic alcohol, introducing into the solution sufficient carbon dioxide to at least partially inactivate the guanidine carbonate, then adding said polyvinyl ester to said solution and thereafter heating the resulting mixture to a temperature above 45° C., not higher than the reflux temperature, so as to drive off the carbon dioxide and to cause said ester and alcohol to react.

4. The process for hydrolyzing polyvinyl acetate which comprises dissolving guanidine carbonate in methanol, introducing into the solution sufficient carbon dioxide to at least partially inactivate the guanidine carbonate, then adding polyvinyl acetate to said solution and thereafter heating the resulting mixture to a temperature above 45° C., not higher than the reflux temperature, so as to drive off the carbon dioxide and to cause the polyvinyl acetate and methanol to react.

HAROLD W. BRYANT.

REFERENCES CITED

The following references are of record in the file of this patent:

UNITED STATES PATENTS

| Number | Name | Date |
|---|---|---|
| 2,109,883 | Herrmann | Mar. 1, 1938 |
| 2,208,857 | Schlack | July 23, 1940 |